Patented Apr. 13, 1954

2,675,398

UNITED STATES PATENT OFFICE 2,675,398

PROCESS OF PREPARING AN ALKYL OR ARYL TIN COMPOUND

Hugh E. Ramsden, Metuchen, N. J., and Harold Davidson, New York, N. Y., assignors to Metal & Thermit Corporation, New York, N. Y., a corporation of New Jersey No Drawing. Application September 29, 1950, Serial No. 187,668

11 Claims. (Cl. 260—429)

The present invention relates to a new and improved process of preparing an alkyl or aryl tin compound utilizing a Grignard synthesis.

Organometallic compounds such as tetra alkyl tin, may be used, for example, as intermediates in the preparation of stabilizers for chlorinated organics and in the preparation of oil additives.

One object of the present invention is to provide a new and improved process of producing a high yield of alkyl or aryl tin compound through a Grignard synthesis.

Another object is to provide a new and improved process of producing a high yield of alkyl or aryl tin compound through a Grignard synthesis without the use of ether solvents.

A further object is to provide a new and improved process of producing a high yield of alkyl or aryl tin compound through a one step Grignard-type operation.

In carrying out the process of the present invention, an alkyl or aryl halide and tin tetrachloride in approximately 4 to 1 mole ratio are added to magnesium activated as, for example, by the halide or ethyl bromide in the presence of ether in catalytic quantities, as for example from 5 to 20 ml. per mole of alkyl or aryl halide employed. The solvent used is any suitable inert hydrocarbon such as xylene, toluene, decane, hexane or octane, and the reaction is carried out at a temperature of 65° to 185° C. and preferably between 85 to 95° C. The high temperature employed assures high conversion of the tin tetrachloride to tetra alkyl or tetra aryl tin. If ether solvent were employed at this high temperature, this ether might react with the Grignard reagent produced.

The molar ratio of the alkyl or aryl halide, tin tetrachloride and magnesium is approximately 4:1:4 and the yields produced are high, since the Grignard reagent is removed by the tin tetrachloride as fast as it forms, thus decreasing side reactions.

The following example illustrates a certain way in which the principle of the invention has been applied, but it is not to be construed as limiting the broader aspects of the invention.

Magnesium turnings (24.0 gm., 1 mole) were placed in a three-necked, one-liter flask equipped with a stirrer, reflux condenser, thermometer and dropping funnel. To the magnesium was added a crystal of iodine, 1 ml. of ethyl bromide and 10 ml. of absolute ethyl ether. As soon as the magnesium was reacting as evidenced by heat evolution, 100 ml of toluene was added and the batch was heated to 80–85° C. A mix of butyl chloride (92.5 gm., 1 mole) and tin tetrachloride (65.2 gm., 0.25 mole) in 200 ml. of toluene was added dropwise with stirring. Reaction began immediately, as shown by a sludge formation and increased refluxing. Heating was discontinued, the heat of reaction maintaining the temperature. The mix was added as rapidly as possible without overloading the condenser. After the addition was complete, stirring and reflux was maintained for ½ to 1 hour. The batch was then cooled and then filtered or extracted with acidified water and the toluene solution was stripped of solvent. The organotin compounds were vacuum fractionated. An actual yield of approximately 85% butyl and 90% tin was obtained. The product was mainly $Bu_4Sn$ and $Bu_3SnCl$ with a small amount of $Bu_2SnCl_2$.

While the invention has been described with particular reference to a specific embodiment, it is to be understood that it is not to be limited thereto, but is to be construed broadly and restricted solely by the scope of the appended claims.

What is claimed is:

1. The method of producing an organotin compound comprising reacting a compound of the class consisting of an alkyl halide and aryl halide with tin tetrachloride and magnesium in the presence of an inert hydrocarbon solvent and in the presence of a catalyst in minor proportions not sufficient to serve as the major solvent.

2. The method of producing an organotin compound comprising activating magnesium to render it reactive and adding tin tetrachloride and a compound of the class consisting of an alkyl halide and aryl halide in the presence of an inert hydrocarbon solvent, and in the presence of an ether in minor catalyzing proportions not sufficient to serve as the major solvent.

3. The method of producing an organotin compound comprising activating magnesium by means of ethyl bromide to render it reactive, and adding tin tetrachloride and a compound of the class consisting of an alkyl halide and aryl halide in the presence of an ether in minor catalyzing proportions not sufficient to serve as the major solvent and in the presence of an inert hydrocarbon in major proportions to serve as the major solvent.

4. The method of producing an organotin compound comprising reacting a compound of the class consisting of an alkyl halide and aryl halide with tin tetrachloride and magnesium in the presence of an inert hydrocarbon solvent at a temperature of between 65 and 185° C., and in the presence of a catalyst in minor proportions not sufficient to serve as the major solvent.

5. The method of producing an organotin compound comprising activating magnesium to render it reactive, adding tin tetrachloride and a compound of the class consisting of an alkyl halide and aryl halide in the presence of an ether in minor catalyzing proportions not sufficient to serve as the major solvent and in the presence of an inert hydrocarbon solvent, and maintaining a reaction temperature of between 65 and 185° C.

6. The method of producing an organotin compound comprising reacting a compound of the class consisting of an alkyl halide and aryl halide with tin tetrachloride and magnesium in the presence of an inert solvent of the class consisting of toluene, xylene, decane, hexane and octane in the presence of an ether in minor catalyzing proportions not sufficient to serve as the major solvents.

7. The method of producing an organotin compound comprising adding an alkyl halide and tin tetrachloride to reactive magnesium in the approximate molar ratio of 4 to 1 to 4 in the presence of an ether in catalytic quantities of 5 to 20 ml. per mole of the halide compound and in the presence of an inert hydrocarbon solvent and maintaining the reaction temperature between 65 and 185° C.

8. The method of producing an organotin compound comprising activating magnesium to render it reactive, and adding an alkyl halide and tin tetrachloride to the activated magnesium in the approximate molar ratio of 4 to 1 to 4 in the presence of an ether in minor catalyzing proportions not sufficient to constitute the major solvent, and in the presence of toluene as a solvent while maintaining the reaction temperature between 65 and 185° C.

9. The process as described in claim 8, in which the reaction temperature is maintained at between 85 and 95° C.

10. The method of producing an organotin compound comprising adding butyl chloride and tin tetrachloride to activated magnesium in the approximate molar ratio of 4 to 1 to 4 in the presence of ether in catalytic quantities and in the presence of an inert hydrocarbon solvent and maintaining the reaction temperature between 65 and 185° C.

11. The method of producing an organotin compound comprising activating magnesium to render it reactive and adding a compound of the class consisting of an alkyl halide and aryl halide and tin tetrachloride to the activated magnesium in the approximate molar ratio of 4 to 1 to 4 in the presence of an ether in catalytic amount of 5 to 20 ml. per mole of said halide compound and in the presence of an inert solvent of the class consisting of toluene, xylene, decane, hexane and octane while maintaining the reaction temperature between 65 and 185° C.

References Cited in the file of this patent

UNITED STATES PATENTS

| Number | Name | Date |
|---|---|---|
| 2,066,198 | Buc | Dec. 29, 1936 |

OTHER REFERENCES

Goddard et al., Textbook of Inorganic Chemistry, Vol. 11, Part I (1928), pages 301–2.

Tomaka et al., Aeronautical Research Inst. Reports, Vol. 2, (1926–1927), pages 410–417.